W. F. EDGINGTON.
JACK FOR TIGHTENING ANTISKID CHAINS.
APPLICATION FILED FEB. 29, 1912.
1,026,499.
Patented May 14, 1912.
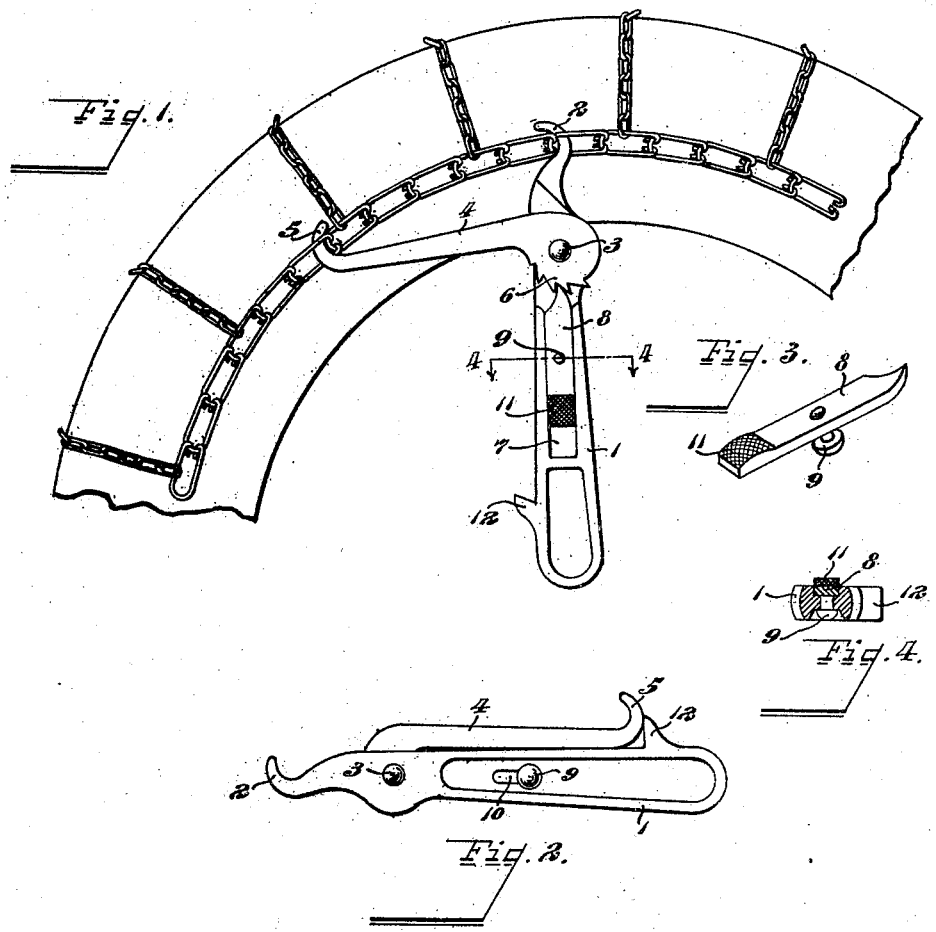

UNITED STATES PATENT OFFICE.

WILLIAM F. EDGINGTON, OF SPRINGFIELD, OHIO, ASSIGNOR OF ONE-HALF TO ALEXANDER MURRAY, OF SPRINGFIELD, OHIO.

JACK FOR TIGHTENING ANTISKID-CHAINS.

1,026,499.  Specification of Letters Patent.  Patented May 14, 1912.

Application filed February 29, 1912. Serial No. 680,704.

*To all whom it may concern:*

Be it known that I, WILLIAM F. EDGINGTON, a citizen of the United States, residing at Springfield, in the county of Clark and State of Ohio, have invented certain new and useful Improvements in Jacks for Tightening Antiskid-Chains, of which the following is a specification.

My invention relates to improvements in chain tighteners, and particularly to a device for tightening the ordinary anti-skid chains used in vehicle wheels.

The object of my invention is to provide a device of this character which will be simple in construction and effective in operation, and to particularly provide a device which may be retained in tightened position without the aid of the operator during the process of fastening the chain in position or repairing the chain.

In the accompanying drawings,—Figure 1 is a side view of a device embodying my invention, also showing a portion of a vehicle wheel and an anti-skid chain, and the manner of applying the device thereto. Fig. 2 is a view of the opposite side of the device showing the parts thereof in closed position. Fig. 3 is a detail of the pawl used for securing the parts in tightened position. Fig. 4 is a section on the line 4—4 of Fig. 1.

Like parts are represented by similar characters of reference in the several views.

In the accompanying drawings, 1 represents a main lever portion having a hook-shaped end 2. Pivotally connected to this lever 1, as at 3, is an arm 4, the free end of which is also provided with a hook-shaped portion 5, the pivotal point 3 being near the hoop-shaped end of the lever 1. The arm 4, about its pivotal point, is provided with a series of ratchet teeth 6, and slidably mounted in a way or groove 7 in the part 1, is a pawl 8, held in position by a headed pin 9, riveted to the pawl and operated in a slot 10 in the part 1.

In operation, the hooks of the respective parts 1 and 4 are engaged in the links of the chain, whereupon, the operator, by using the part 1 as a lever pivoting at the point 3, may swing the same around so as to cause the hooks to approach each other and draw the ends of the chain together. As the operator grasps the lever 1, he places his thumb upon the knurled portion 11 of the pawl and so soon as the chain has been sufficiently tightened, he may thus readily press the pawl into engagement with the ratchet teeth and hold the parts in this position until after the chain has been united together when the tool is being used to place the chain upon the wheel, or until the chain has been repaired when the tool is being used for that purpose.

Projecting laterally from near the end of the portion 1 is a projection 12, so positioned that when the arm 4 is thrown to the position shown in Fig. 2, the rounded surface of the hook-shaped portion 5 thereof will contact the projection 12 and be held in position by the frictional engagement thereof, the natural resiliency of the metal permitting it to be forced into position by a slight pressure thereon.

Having thus described my invention I claim:—

1. In a chain tightener, a main lever portion having a hook-shaped end, an arm pivotally connected therewith with its free end also provided with a hook, said arm having a series of ratchet teeth arranged about its pivotal point, and a pawl on the main lever portion for engagement with said ratchet teeth.

2. In a chain tightener, a main lever portion having a hook-shaped end, an arm pivotally connected with said lever portion, said arm having a hook at its free end and ratchet teeth at its pivotal end, and a pawl slidably mounted in said main lever portion for engagement with the said ratchet teeth.

3. In a chain tightener, a main lever portion having a hook-shaped end, an arm pivotally connected with said main lever portion, said arm having a hook at its free end and ratchet teeth at its pivotal end, a groove-way in said main lever portion, and a pawl in said groove-way slidably connected with said main lever portion for engagement with said ratchet teeth.

4. In a chain tightener, a main lever portion having a hook-shaped end, an arm pivotally connected with said lever portion, said arm having a hook at its free end and ratchet teeth on its pivotal end, a pawl on said main lever portion for engagement with said ratchet teeth, and a projection on said main lever portion adapted to engage the hook end of said arm and hold the same in closed position.

In testimony whereof, I have hereunto set my hand this 22nd day of February 1912.

WILLIAM F. EDGINGTON.

Witnesses:
 CHAS. I. WELCH,
 ESTHER E. PFEIFER.